United States Patent [19]

Van Doorn et al.

[11] Patent Number: 5,218,086

[45] Date of Patent: Jun. 8, 1993

[54] POLYMERIZATION OF CO/OLEFIN WITH 9-PHOSPHA BICYCLO NONYL BIDENTATE CATALYST

[75] Inventors: Johannes A. Van Doorn; Peter A. A. Klusener; Johannes J. M. Snel, all of Amsterdam, Netherlands

[73] Assignee: Shell Oil Company, Houston, Tex.

[21] Appl. No.: 795,159

[22] Filed: Nov. 20, 1991

[30] Foreign Application Priority Data

Nov. 27, 1990 [NL] Netherlands .......................... 9002575

[51] Int. Cl.$^5$ ............................................. C08G 67/02
[52] U.S. Cl. ................................... 528/392; 502/162; 568/12
[58] Field of Search ........................................ 528/392

[56] References Cited

U.S. PATENT DOCUMENTS

| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,880,903 | 11/1989 | Van Broekhoven et al. | 528/392 |

FOREIGN PATENT DOCUMENTS 1127965 9/1968 United Kingdom .

*Primary Examiner*—Harold D. Anderson

[57] ABSTRACT

Polymers of carbon monoxide with one or more olefinically unsaturated compounds are prepared by contacting the monomers with a palladium phosphorus bidentate catalyst in which at least one of the phosphorus atoms of the bidentate forms part of a 9-phosphabicyclononyl structure.

20 Claims, No Drawings

POLYMERIZATION OF CO/OLEFIN WITH 9-PHOSPHA BICYCLO NONYL BIDENTATE CATALYST

FIELD OF THE INVENTION

The invention relates to a process for the preparation of polymers of carbon monoxide with one or more olefinically unsaturated compounds.

BACKGROUND OF THE INVENTION

Linear polymers of carbon monoxide with one or more olefinically unsaturated compounds are made up of polymer units from carbon monoxide on one hand and units from the olefinically unsaturated compounds on the other hand which occur in a substantially alternating arrangement. These polymers can be prepared by contacting the monomers at elevated temperature and pressure with a catalyst composition containing a Group VIII metal and a tri(hydrocarbyl)phosphine such as tri(n-butyl)phosphine or triphenylphosphine.

A drawback of the above-mentioned catalyst compositions is their low polymerization activity. In the past the applicant has carried out an investigation in order to find out whether the polymerization activities of these catalyst compositions could be increased by modification of their phosphine component. As to the catalyst compositions containing triphenylphosphine as a phosphine component, it was found that the polymerization activity could be considerably increased by incorporating a substituent in the phenyl groups at the ortho position relative to the phosphorus atom. For example, in the copolymerization of carbon monoxide with ethene using a catalyst composition containing palladium as Group VIII metal and triphenylphosphine as a phosphine, an increase in the polymerization activity by a factor of 10 was observed when the triphenylphosphine was replaced by tris(2-methylphenyl)phosphine. A considerable increase in the polymerization activity could also be obtained by replacing the triphenylphosphine in the catalyst composition by tris(2-methoxyphenyl)phosphine. It was additionally found that an increase in the polymerization activity of the catalyst compositions containing a Group VIII metal and a tri(hydrocarbyl)phosphine could also be obtained by replacing one of the hydrocarbyl groups in the tri(hydrocarbyl)phosphine with a nitrogen-containing group wherein the nitrogen atom is connected to the phosphorus atom via a divalent organic bridging group containing at least two carbon atoms in the bridge. A considerable increase in the polymerization activity in the copolymerization of carbon monoxide with ethene could also be achieved by replacing triphenylphosphine in a catalyst composition containing palladium as a Group VIII metal with a phosphine such as 2-cyanoethyldiphenylphosphine or with a 3-(diphenylphosphino)-N,N-dimethylpropionamide.

After continued research in this subject area, it has now been found that the polymerization activity of catalysts containing a Group VIII metal and a phosphine of the general formula $R_1R_2R_3P$ in which $R_1$ to $R_3$ represent identical or different optionally polar substituted hydrocarbon groups can be improved considerably more than was found possible with the aid of the previously mentioned modifications by replacing one of the groups $R_1$ to $R_3$ with a phosphorus-containing group in which phosphorus occurs in a 9-phosphabicyclononane structure where the smallest phosphorus-containing ring contains at least five atoms, and the bridging group incidentally has a structure such that, in the obtained diphosphorus compound, the two phosphorus atoms are connected to each other via a divalent organic bridging group containing at least two carbon atoms in the bridge. The diphosphorus compounds now proposed as catalyst component can be represented by the general formula $(R_1)(R_2)P-R-X$ in which $R_1$ and $R_2$ represent identical or different optionally polar substituted hydrocarbon groups, and R is a divalent organic bridging group containing at least two carbon atoms in the bridge connecting the two phosphorus atoms in the diphosphorus compound to each other and, X is a 9-phosphabicyclononyl group in which the smallest phosphorus-containing ring contains at least five atoms, and the bridging group is connected via the phosphorus atom to a carbon atom of the bridging group R. It was found during the investigation that diphosphorus compounds in which two 9-phosphabicyclononyl groups occur, the phosphorus atoms of which are connected to each other via a bridging group R, are also very suitable for being used together with a Group VIII metal as catalysts in the preparation of polymers of carbon monoxide with one or more olefinically unsaturated compounds. The latter diphosphorus compounds can be represented by the general formula X-R-X.

SUMMARY OF THE INVENTION

The present invention therefore relates to a process for the preparation of polymers, wherein polymers of carbon monoxide with one or more olefinically unsaturated compounds are prepared by contacting the monomers at elevated temperature and pressure with a catalyst composition containing a Group VIII metal and a diphosphorus compound of the general formula $(R_1)(R_2)P-R-X$ or X-R-X. The patent application further relates to the polymers thus prepared and to shaped objects consisting at least partly of these polymers.

DETAILED DESCRIPTION OF THE PREFERRED EMBODIMENT

In this patent application, Group VIII metals are understood to be the noble metals ruthenium, rhodium, palladium, osmium, iridium and platinum, as well as the iron group metals iron, cobalt and nickel.

The Group VIII metal in the catalyst compositions is preferably selected from palladium, nickel and cobalt. Palladium is particularly preferred as the Group VIII metal. The Group VIII metal is preferably incorporated in the catalyst compositions in the form of a salt of a carboxylic acid and, in particular, in the form of an acetate. In addition to a Group VIII metal and a diphosphorus compound, the catalyst compositions preferably also contain an anion of an acid with a pKa of less than 4 and in particular an anion of an acid with a pKa of less than 2. Examples of acids with a pKa of less than 2 are mineral acids such as sulfuric acid and perchloric acid, sulphonic acids such as methanesulfonic acid, trifluoromethanesulfonic acid and para-toluenesulfonic acid, and halocarboxylic acids such as trichloroacetic acid, difluoroacetic acid and trifluoroacetic acid. A sulfonic acid such as para-toluenesulphonic acid or a halocarboxylic acid such as trifluoroacetic acid is preferred. The anion can be introduced into the catalyst compositions either in the form of a compound from which the desired anion splits off or in the form of a mixture of compounds from which the desired anion is formed by mutual reaction. As a rule, the anion is incorporated in the catalyst compositions in the form of an acid. If desired, the anion can also be included in the catalyst composition in the form of a main group metal salt or a non-noble transition metal salt of the acid in question. If an anion of a carboxylic acid is chosen, its incorporation in the catalyst compositions can take place in the form of the acid or in the form of a derivative thereof, such as an alkyl or aryl ester, an amide, an imide, an anhydride, an ortho-ester, a lactone, a lactam or an alkylidene dicarboxylate. The anion is preferably present in the catalyst compositions in a quantity of 1 to 100, and in particular 2 to 50 mole per g.atom of a Group VIII metal. As well as by its introduction as a separate component, the anion of an acid with a pKa of less than 4 can also be present in the catalyst compositions through the use of, for example, palladium trifluoroacetate or palladium para-tosylate as a Group VIII metal compound.

In addition to a Group VIII metal, a diphosphorus compound and a anion of an acid with a pKa of less than 4 or 2, the catalyst compositions can also contain an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-benzoquinone and 1,4-naphthoquinone are preferred. The quantity of organic oxidizing agent employed is preferably 5 to 5000 and in particular 10 to 1000 mole per g.atom Group VIII metal.

The diphosphorus compound is preferably present in the catalyst compositions in a quantity of 0.5 to 2 and in particular 0.75 to 1.5 mole per g.atom Group VIII metal. In the diphosphorus compounds the 9-phosphabicyclononyl group generally occurs in two isomeric structures, viz. as 9-phosphabicyclo[4,2,1]-nonyl and as 9-phosphabicyclo[3,3,1]-nonyl. For the sake of simplicity, these isomeric structures which both occur together will be referred to as $X_1$ and $X_2$, respectively. A consequence of the occurrence of these two isomeric structures is that if use is made according to the invention of catalyst compositions containing diphosphorus compounds with the general formula $(R_1)(R_2)P-R-X$, two different diphosphorus compounds are generally present in the general formula $(R_1)(R_2)P-R-X_1$ and $(R_1)(R_2)P-R-X_2$, while if use is made according to the invention of the catalyst compositions containing diphosphorus compounds of the general formula X-R-X, the three different diphosphorus compounds are generally present therein with the general formula $X_1-R-X_1$, $X_2-R-X_2$ and $X_1-R-X_2$.

The divalent bridging group R which occurs in the diphosphorus compounds preferably contains three or four atoms in the bridge connecting the two phosphorus atoms to each other. Examples of very suitable bridging groups for the present purpose are the —$CH_2$—$CH_2$—$CH_2$— group, the —$CH_2$—$CH_2$—$CH_2$—$CH_2$— grou and the —$CH_2$—$Si(CH_3)_2$—$CH_2$— group.

The carbon atoms which occur in the 9-phosphabicyclononyl groups present in the diphosphorus compounds can carry substituents such as methyl groups. Examples of such substituted 9-phosphabicyclononyl groups are the 3,7-dimethyl substituted 9-phosphabicyclononyl group and the 3,8-dimethyl substituted 9-phosphabicyclononyl group.

If in the process according to the invention use is made of catalyst compositions containing diphosphorus compounds with the general formula $(R_1)(R_2)P-R-X$, diphosphorus compounds are preferred in which the groups $R_1$ and $R_2$ are identical aromatic hydrocarbon groups and in particular diphosphorus compounds in which the groups $R_1$ and $R_2$ are phenyl groups.

Examples of diphosphorus compounds with the general formula $(R_1)(R_2)P-R-X$ with which according to the invention very favorable results were obtained are:
1) a mixture of 1-diphenylphosphino-3-P-(9-phosphabicyclo-[4,2,1]nonyl)propane with 1-diphenylphosphino-3-P-(9-phosphabicyclo-[3,3,1]-nonyl)propane (hereinafter referred to as mixture 1), and
2) a mixture of 1-diphenylphosphino-4-P-(9-phosphabicyclo-[4,2,1]-nonyl)butane with 1-diphenylphosphino-4-P-(9-phosphabicyclo[3,3,1]-nonyl)butane (hereinafter referred to as mixture 2).

Examples of diphosphorus compounds with the general formula X-R-X with which according to the invention very favorable results were obtained:
1) a mixture of 1,3-P,P'-bis(9-phosphabicyclo-[4,2,1]-nonyl)propane with 1,3-P,P'-bis(9-phosphabicyclo-[3,3,1]-nonyl)propane and with 1-P-(9-phosphabicyclo-[4,2,1]-nonyl)-3-P'-(9-phosphabicyclo[3,31]-nonyl)propane (hereinafter referred to as mixture 3),
2) a mixture of 1,4-P,P'-bis(9-phosphabicyclo-[4,2,1]-nonyl)butane with 1,4-P,P'-bis(9-phosphabicyclo-[3,3,1]-nonyl)butane and with 1-P-(9-phosphabicyclo-[4,2,1]-nonyl)-4-P'-(9-phosphabicyclo-[3,3,1]-nonyl)-butane (hereinafter referred to as mixture 4), and
3) a mixture of 2,2-dimethyl-1,3-P,P'-bis(9-phosphabicyclo-[4,2,1]-nonyl)-2-silapropane with 2,2-dimethyl-1,3-P,P'-bis(9-phosphabicyclo-[3,3,1]-nonyl)-2-silapropane and with 2,2-dimethyl-1-P-(9-phosphabicyclo-[4,2,1]-nonyl)-3-P'-(9-phosphabicyclo-[3,3,1]-nonyl)-2-silapropane (hereinafter referred to as mixture 5).

The mixtures 1, 2 and 5 are novel. Each of the mixtures was prepared starting from a mixture of 9-phosphabicyclo-[4,2,1]-nonane and 9-phosphabicyclo-[3,3,1]-nonane.

Mixture 1 was prepared by first reacting the nonane mixture with 1-iodo-3-chloropropane, then with sodium methoxide and finally with lithiumdiphenylphosphide.

Mixture 2 was prepared by first reacting the nonane mixture with butyllithium, then with 1-bromo-4-chlorobutane and finally with lithiumdiphenylphosphide.

Mixture 5 was prepared by first reacting the nonane mixture with butyllithium, then with 2,2-dimethyl-1,3-dichloro-2- silapropane.

The polymerization according to the invention is preferably carried out by contacting the monomers with a solution of the catalyst composition in a diluent in which the polymers are insoluble or virtually insoluble. Lower alcohols such as methanol are very suitable as diluents. If desired, the polymerization can also be carried out in the gas phase. Olefinically unsaturated compounds, which according to the invention can be polymerized with carbon monoxide, suitably consist solely of carbon and hydrogen although compounds which in addition to carbon and hydrogen also contain one or more heteroatoms are also useable. The process according to the invention is preferably used for the preparation of polymers of carbon monoxide with one or more olefinically unsaturated hydrocarbons. Examples of suitable hydrocarbon monomers are ethene and α-olefins such as propene, butene-1, hexene-1 and octene-1, styrene and alkyl substituted styrenes such as para-methylstyrene and para-ethylstyrene, norbornene and dicyclopentadiene. The process according to the invention is particularly suitable for use in the preparation of copolymers of carbon monoxide with ethene or with propene and in the preparation of terpolymers of carbon monoxide with ethene and with propene.

The quantity of catalyst composition used in the preparation of the polymers can vary within wide limits. A quantity of catalyst composition is preferably used which contains $10^{-7}$ to $10^{-3}$ and in particular $10^{-6}$ to $10^{-4}$ g.atom Group VIII metal per mole of olefinically unsaturated compound to be polymerized.

The preparation of the polymers is preferably carried out at a temperature of 25° to 150° C. and a pressure of 2 to 150 bar and in particular at a temperature of 30° to 130° C. and a pressure of 5 to 100 bar.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

EXAMPLES

The invention will be described by the following examples which are provided for illustrative purposes and are not to be construed as limiting the invention:

EXAMPLE 1

A carbon monoxide/ethene copolymer was prepared as follows. Into a stirred autoclave with a volume of 250 ml, a catalyst solution was introduced consisting of:
  50 ml methanol,
  0.1 mmol palladium acetate,
  2.0 mmol para-toluenesulphonic acid, and
  0.3 mmol triphenylphosphine.

After forcing in a 30 bar ethene and a 30 bar carbon monoxide, the contents of the autoclave were brought to 110° C. After 5 hours the polymerization was terminated by cooling to room temperature and releasing the pressure. The polymer formed was filtered off, washed with methanol and dried. The polymerization rate was 5 g copolymer/(g palladium.hour).

EXAMPLE 2

A carbon monoxide/ethene copolymer was prepared in substantially the same way as in example 1, but with the difference that the catalyst solution contained 1.0 mmol instead of 2.0 mmol para-toluenesulphonic acid and 0.15 mmol tris(2-methylphenyl)phosphine instead of triphenylphosphine.

The polymerization rate was 50 g copolymer/(g palladium.hour).

EXAMPLE 3

A carbon monoxide/ethene copolymer was prepared in substantially the same way as in example 1, but with the following differences:
  a) the catalyst solution contained 1.0 mmol instead of 2.0 mmol para-toluenesulphonic acid and 0.3 mmol tris(2-methoxyphenyl)phosphine instead of triphenylphosphine, and
  b) the reaction temperature was 105° C. instead of 110° C.

The polymerization rate was 20 g copolymer/(g palladium.hour).

EXAMPLE 4

A carbon monoxide/ethene copolymer was prepared in substantially the same way as in example 1, but with the following differences:
  a) the catalyst solution contained 0.2 mmol instead of 0.1 mmol palladium acetate and 0.5 mmol 2-cyanoethyldiphenylphosphine instead of triphenylphosphine, and
  b) the reaction temperature was 80° C. instead of 110° C.

The polymerization rate was 24 g copolymer/(g palladium.hour).

EXAMPLE 5

A carbon monoxide/ethene copolymer was prepared in substantially the same way as in example 1, but with the following differences:
  a) the catalyst solution contained 1.0 mmol instead of 2.0 mmol para-toluenesulphonic acid and 0.15 mmol 3-(diphenylphosphino)N,N-dimethylpropionamide instead of triphenylphosphine, and
  b) the reaction temperature was 105° C. instead of 110° C.

The polymerization rate was 28 g copolymer/(g palladium.hour).

EXAMPLE 6

A carbon monoxide/ethene copolymer was prepared as follows. Into a stirred autoclave with a volume of 100 ml from which air had been driven out by purging with nitrogen a catalyst solution was introduced consisting of:
  40 ml methanol,
  0.05 mmol palladium acetate,
  0.055 mmol mixture 1, and
  0.1 mmol para-toluenesulphonic acid.

After forcing in a 1:1 carbon monoxide/ethene mixture until a pressure of 40 bar was reached, the contents of the autoclave were brought to 90° C. During the polymerization the pressure was kept constant by forcing in a 1:1 carbon monoxide/ethene mixture. After 1 hour the polymerization was terminated by cooling the reaction mixture to room temperature and releasing the pressure. The polymer formed was filtered off, washed with methanol and dried.

3.3 g copolymer was obtained. The polymerization rate was 620 g copolymer/(g palladium.hour).

EXAMPLE 7

A carbon monoxide/ethene copolymer was prepared in substantially the same way as in example 6, but with the difference that the catalyst solution contained mixture 2 instead of mixture 1.

2.3 g copolymer was obtained. The polymerization rate was 430 g copolymer/(g palladium.hour).

EXAMPLE 8

A carbon monoxide/ethene copolymer was prepared in substantially the same way as in example 6, but with the difference that the catalyst solution contained mixture 3 instead of mixture 1.

3.3 g copolymer was obtained. The polymerization rate was 610 g copolymer/(g palladium.hour).

EXAMPLE 9

A carbon monoxide/ethene copolymer was prepared in substantially the same way as in example 6, but with the difference that the catalyst solution contained mixture 4 instead of mixture 1.

1.3 g copolymer was obtained. The polymerization rate was 250 g copolymer/(g palladium.hour).

EXAMPLE 10

A carbon monoxide/ethene copolymer was prepared in substantially the same way as in example 6, but with the difference that the catalyst solution contained mixture 5 instead of mixture 1.

1.4 g copolymer was obtained. The polymerization rate was 250 g copolymer/(g palladium.hour).

EXAMPLE 11

A carbon monoxide/ethene/propene terpolymer was prepared as follows. Into a stirred autoclave with a volume of 100 ml from which air had been driven out by purging with nitrogen a catalyst solution was introduced consisting of:
- 40 ml methanol,
- 0.05 mmol palladium acetate,
- 0.055 mmol mixture 1, and
- 0.1 mmol para-toluenesulphonic acid.

After adding 10.2 g propene, the temperature was brought to 90° C. and then a 1:1 carbon monoxide/ethene mixture was forced in until a pressure of 40 bar was reached. During the polymerization the pressure was kept constant by forcing in a 1:1 carbon monoxide/ethene mixture. After 1.5 hours the polymerization was terminated by cooling the reaction mixture to room temperature and releasing the pressure. The polymer formed was filtered off, washed with methanol and dried.

1.5 g terpolymer was obtained. The polymerization rate was 180 g terpolymer/(g palladium.hour).

EXAMPLE 12

A carbon monoxide/ethene/propene terpolymer was prepared in substantially the same way as in example 11, but with the following differences:
a) the catalyst solution contained mixture 2 instead of mixture 1, and
b) 10.5 g propene was introduced into the autoclave instead of 10.2 g propene.

0.6 g terpolymer was obtained. The polymerization rate was 80 g terpolymer/(g palladium.hour).

EXAMPLE 13

A carbon monoxide/ethene/propene terpolymer was prepared in substantially the same way as in example 11, but with the following differences:
a) the catalyst solution contained mixture 3 instead of mixture 1,
b) 9.9 g propene was introduced into the autoclave instead of 10.2 g propene, and
c) the reaction time was 2 hours instead of 1.5 hours.

2.6 g terpolymer was obtained. The polymerization rate was 240 g terpolymer/(g palladium.hour).

EXAMPLE 14

A carbon monoxide/ethene/propene terpolymer was prepared in substantially the same way as in example 11, but with the following differences.
a) the catalyst solution contained mixture 4 instead of mixture 1, and
b) 9.0 g propene was introduced into the autoclave instead of 10.2 g propene.

1.1 g terpolymer was obtained. The polymerization rate was 130 g terpolymer/(g palladium.hour).

EXAMPLE 15

A carbon monoxide/ethene/propene terpolymer was prepared in substantially the same way as in example 11, but with the following differences:
a) the catalyst solution contained mixture 5 instead of mixture 1,
b) 12.5 g propene was introduced into the autoclave instead of 10.2 g propene, and
c) the reaction time was 1 hour instead of 1.5 hours.

0.2 g terpolymer was obtained. The polymerization rate was 40 g terpolymer/(g palladium.hour).

EXAMPLE 16

A carbon monoxide/propene copolymer was prepared as follows. Into a stirred autoclave with a volume of 100 ml from which air had been driven by purging with nitrogen a catalyst solution was introduced consisting of:
- 40 ml methanol,
- 0.05 mmol palladium acetate,
- 0.055 mmol mixture 1, and
- 0.1 mmol para-toluenesulphonic acid.

After adding 10.5 g propene, the contents of the autoclave were brought to 60° C. and then carbon monoxide was forced in until a pressure of 40 bar was reached. During the polymerization the pressure was kept constant by forcing in carbon monoxide. After 17 hours the polymerization was terminated by cooling the reaction mixture to room temperature and releasing the pressure. The polymer was isolated by evaporating down the reaction mixture.

2.6 g copolymer was obtained. The polymerization rate was 30 g copolymer/(g palladium.hour).

EXAMPLE 17

A carbon monoxide/propene copolymer was prepared in substantially the same way as in example 16, but with the following differences:
a) the catalyst solution contained mixture 2 instead of mixture 1, and
b) 10.9 g propene was introduced into the autoclave instead of 10.5 g propene.

5.4 g copolymer was obtained. The polymerization rate was 60 g copolymer/(g palladium.hour).

EXAMPLE 18

A carbon monoxide/propene copolymer was prepared in substantially the same way as in example 16, but with the following differences:
a) the catalyst solution contained mixture 3 instead of mixture 1, and
b) 11.0 g propene was introduced into the autoclave instead of 10.5 g propene.

6.1 g copolymer was obtained. The polymerization rate was 70 g copolymer/(g palladium.hour).

EXAMPLE 19

A carbon monoxide/propene copolymer was prepared in substantially the same way as in example 16, but with the following differences:
a) the catalyst solution contained mixture 4 instead of mixture 1,
b) 9.0 g propene was introduced into the autoclave instead of 10.5 g propene, and c) the reaction time was 17.5 hours instead of 17 hours.

1.6 g copolymer was obtained. The polymerization rate was 20 g copolymer/(g palladium.hour).

EXAMPLE 20

A carbon monoxide/propene copolymer was prepared in substantially the same way as in example 16, but with the difference that the catalyst solution contained mixture 5 instead of mixture 1.

5.1 g copolymer was obtained. The polymerization rate was 60 g copolymer/(g palladium.hour).

EXAMPLE 21

A carbon monoxide/propene copolymer was prepared in substantially the same way as in example 16, but with the following differences:

a) the catalyst solution contained mixture 4 instead of mixture 1,
b) 9.0 g propene was introduced into the autoclave instead of 10.5 g propene,
c) the reaction temperature was 90° C. instead of 60° C., and
d) the reaction time was 2 hours instead of 17 hours.

0.8 g copolymer was obtained. The polymerization rate was 70 g copolymer/(g palladium.hour).

Of the examples 1-21, examples 6-21 are according to the invention. In these examples the polymerizations were carried out using catalyst compositions containing a Group VIII metal and a diphosphorus compound of the general formula $(R_1)(R_2)P-R-X$ or $X-R-X$. Examples 1-5 fall outside the scope of the invention and have been included in the patent application for comparison. Example 1 relates to the preparation of carbon monoxide/ethene copolymers using a catalyst composition containing triphenylphosphine. Examples 2-5 relate to the preparation of carbon monoxide/ethene copolymers using catalyst compositions in which the triphenylphosphine was replaced by compounds derived therefrom, which had previously been found able to impart a higher polymerization activity to the catalyst compositions. The superior properties of the catalyst compositions used in the process according to the invention can be clearly seen by comparison of the results of examples 6-10 with those of examples 2-5. According to examples 2-5, polymerization rates are obtained with the catalyst compositions used in these examples at temperatures of 80° to 110° C. of only 20 to 50 g polymer/(g palladium.hour). The catalyst compositions used in the process according to the invention, however, give polymerization rates of 250 to 620 g polymer/(g palladium.hour) at 90° C.

It was established by $^{13}C$-NMR analysis that the polymers prepared according to examples 1-21 were built up of linear chains in which the units from carbon monoxide on the one hand and the units from the olefins used on the other hand were present in an alternating arrangement. In the terpolymer chains the units from ethene and propene were present in a random distribution.

What is claimed is:

1. A process for the preparation of polymers of carbon monoxide monomer with one or more olefinically unsaturated monomers prepared by contacting the monomers at elevated temperature and pressure with at least one catalyst composition containing a palladium salt, an anion of an acid with a pKa of less than 4, and a diphosphorus compound of the general formula $(R_1)(R_2)P-R-X$, or $X-R-X$, wherein $R_1$ and $R_2$ represent identical or different optionally polar substituted hydrocarbon groups, in which R is a divalent organic bridging group containing at least two carbon atoms in a bridge connecting the two phosphorus atoms in the diphosphorus compound with each other, and wherein X is a 9-phosphabicyclononyl group in which the smallest phosphorus-containing ring contains at least five atoms and the phosphorus atom is connected to a carbon atom of the bridging group R.

2. A process according to claim 1, wherein the palladium salt is a carboxylic acid salt.

3. A process according to claim 1, wherein the catalyst composition contains an anion of an acid with a pKa of less than 2.

4. A process according to claim 3, wherein the catalyst composition contains an anion of a sulfonic acid or of a halocarboxylic acid.

5. A process according to claim 1, wherein the catalyst composition contains the anion of an acid with a pKa of less than 4 in a quantity of 1 to 100 mole per g.atom palladium.

6. A process according to clam 5, wherein the catalyst composition contains the anion of an acid with a pKa of less than 4 in a quantity of 2 to 50 mole per g.atom palladium.

7. A process according to clam 1, wherein the catalyst composition additionally contains an organic oxidizing agent.

8. A process according to claim 7, wherein the catalyst composition contains as organic oxidizing agent a 1,4-quinone.

9. A process according to claim 7 or 8, wherein the catalyst composition contains the organic oxidizing agent in a quantity of 5 to 5000 mole per g.atom palladium.

10. A process according to claim 9, wherein the catalyst composition contains the organic oxidizing agent in a quantity of 10 to 1000 mole per g.atom palladium.

11. A process according to claim 1, wherein the catalyst composition contains the diphosphorus compound in a quantity of 0.5 to 2 mole per g.atom palladium.

12. A process according to claim 11, wherein the catalyst composition contains the diphosphorus compound in a quantity of 0.75 to 1.5 mole palladium.

13. A process according to claim 1, wherein the bridging group R in the diphosphorus compounds contains three or four atoms in the bridge connecting the two phosphorus atoms to each other.

14. A process according to claim 13, wherein the bridging group R is a $-CH_2-CH_2-CH_2-$ group, a $-CH_2-CH_2-CH_2-CH_2-$ group or a $-CH_2-Si(CH_3)_2-CH_2-$ group.

15. A process according to claim 1, wherein the $R_1$ and $R_2$ groups in the diphosphorus compounds of the general formula $(R_1)(R_2)P-R-X$ are identical aromatic hydrocarbon groups.

16. A process according to claim 1, wherein the diphosphorus compound of the general formula $(R_1)(R_2)P-R-X$ consists of a mixture of two isomeric compounds of the general formulae $(R_1)(R_2)P-R-X_1$ and $(R_1)(R_2)P-R-X_2$ and that the diphosphorus compound of the general formula $X-R-X$ consists of a mixture of three isomeric compounds with the general formulae $X_1-R-X_1$, $X_2-R-X_2$ and $X_1-R-X_2$, wherein the group $X_1$ is a 9-phosphabicyclo-nonyl structure and the group $X_2$ is a 9-phosphabicyclo-nonyl structure.

17. A process according to claim 1, wherein the monomers are contacted with a solution of the catalyst composition in a diluent in which the polymers are insoluble or virtually insoluble.

18. A process according to claim 17, wherein the monomers comprise carbon monoxide and ethene with or without propene.

19. A process according to claim 1, wherein the monomers are contacted at a temperature of 25° to 150° C. and a pressure of 2 to 150 bar and at least one catalyst composition contains $10^{-7}$ to $10^{-3}$ g.atom palladium per mole of olefinically unsaturated compound to be polymerized.

20. A process according to claim 19, wherein the monomers are contacted at a temperature of 30° to 130° C. and a pressure of 5 to 100 bar and at least one catalyst composition contains $10^{-6}$ to $10^{-4}$ g.atom palladium per mole of olefinically unsaturated compound to be polymerized.

* * * * *